J. P. GUPPEY.
BLADE GRINDING MACHINE.
APPLICATION FILED OCT. 18, 1911.
1,034,362.
Patented July 30, 1912.
4 SHEETS—SHEET 1.
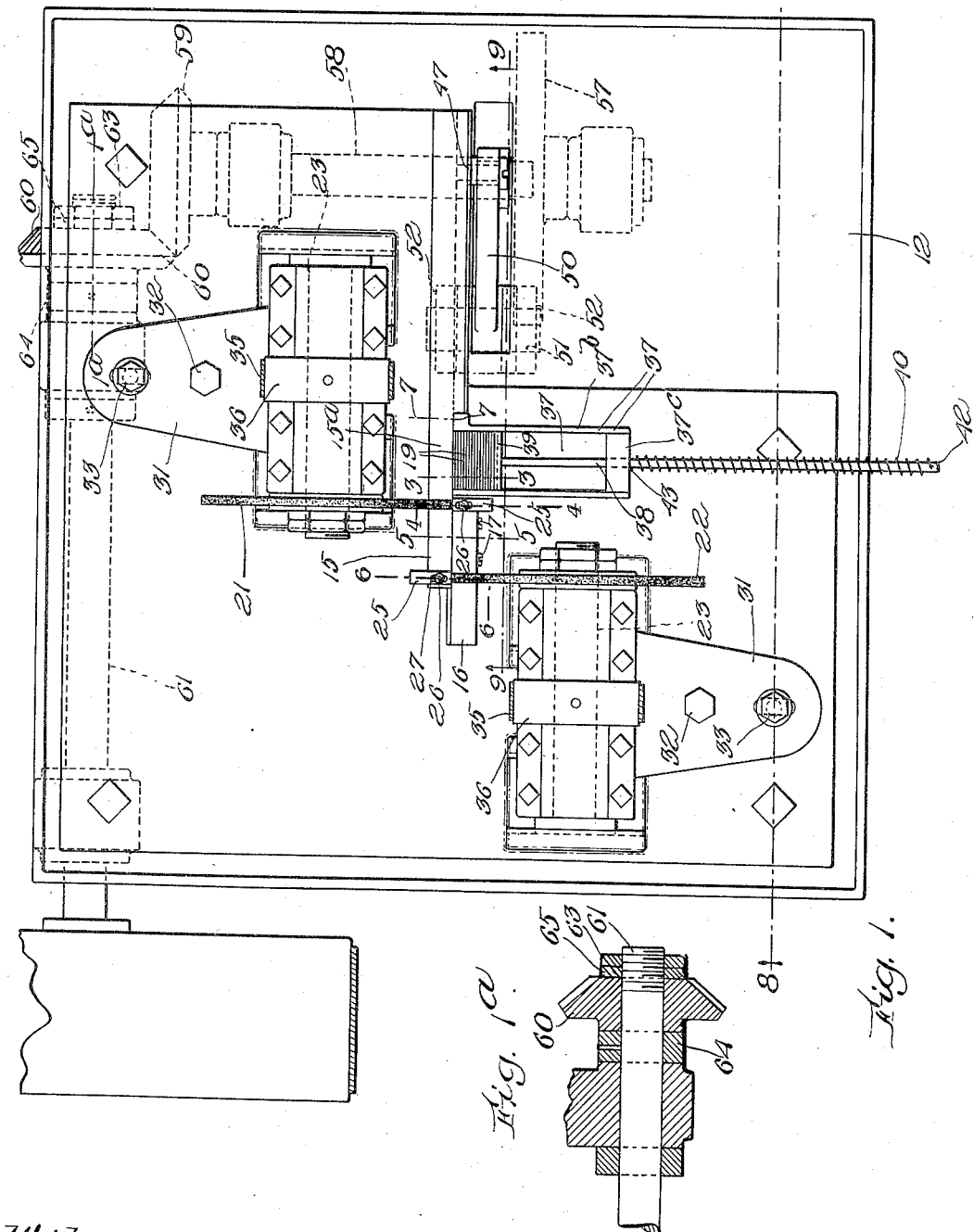
Witnesses:
Inventor
John P. Guppey
by Wright Brown Quinby May
Attys.

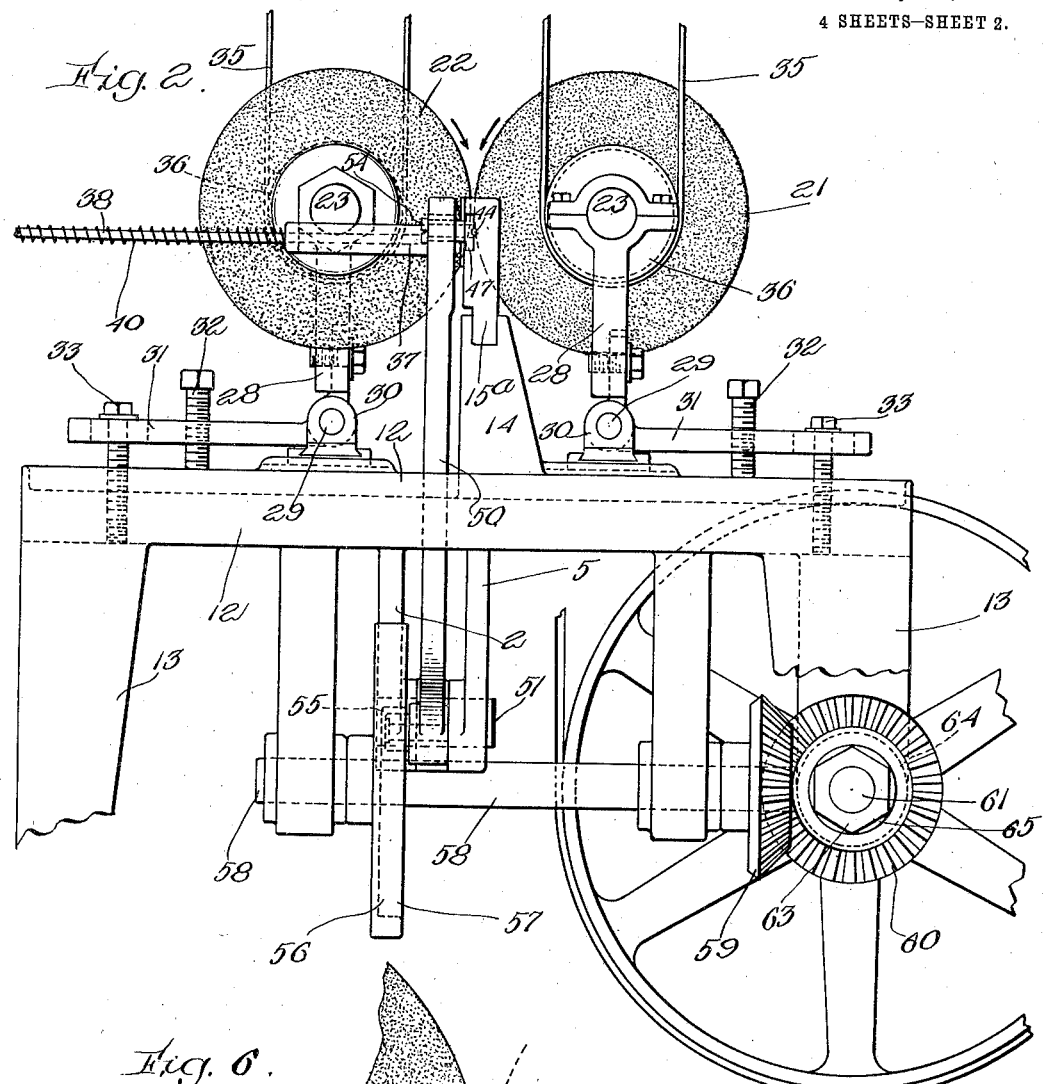

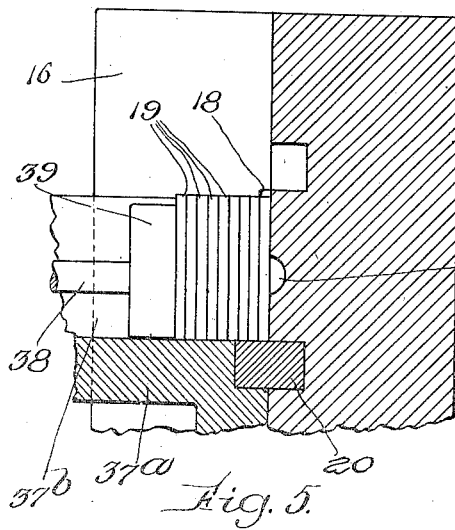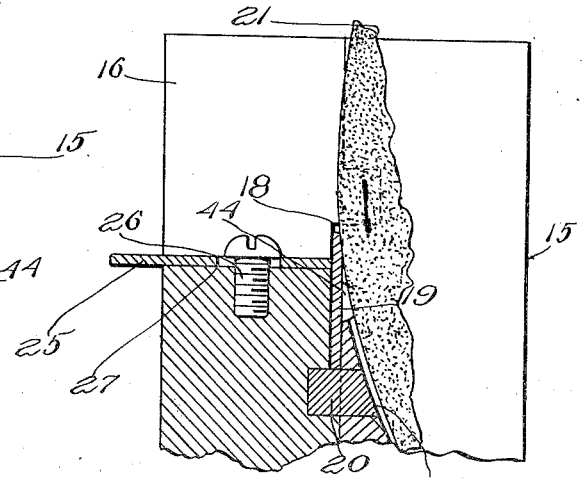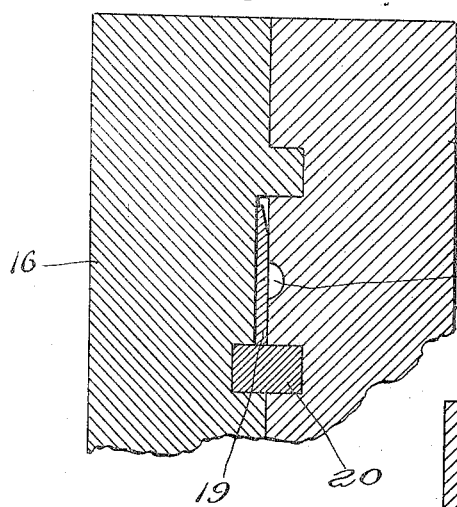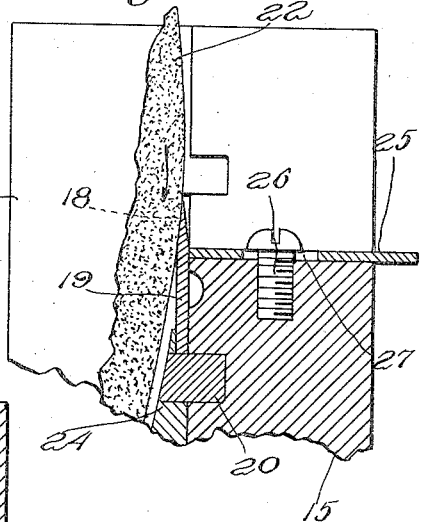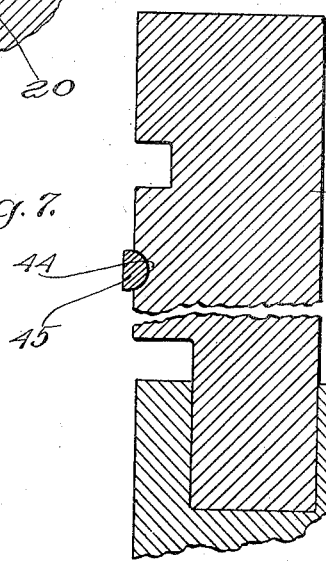

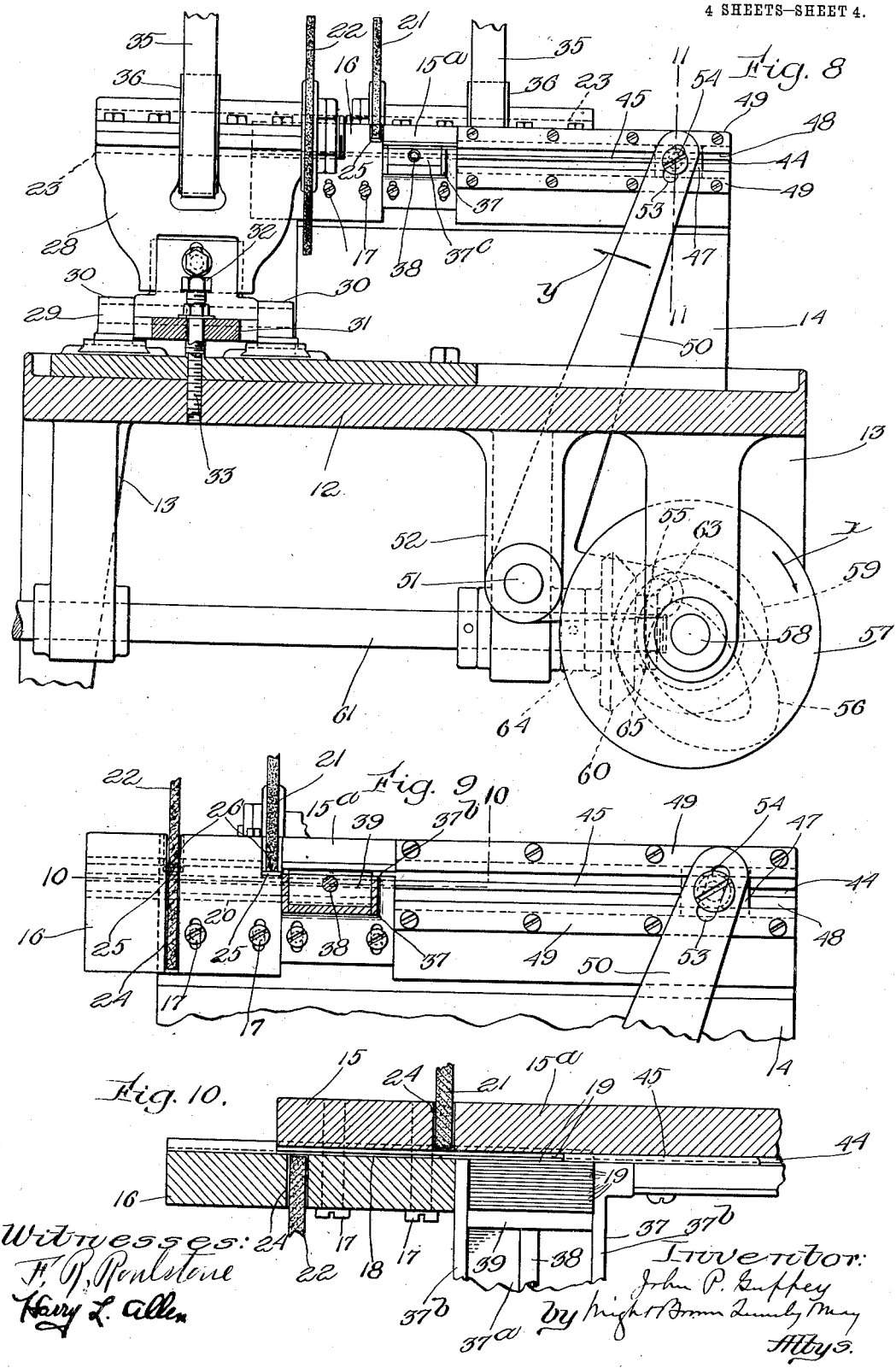

UNITED STATES PATENT OFFICE.

JOHN P. GUPPEY, OF BOSTON, MASSACHUSETTS, ASSIGNOR TO BEDFORD SAFETY RAZOR COMPANY, OF BEDFORD, MASSACHUSETTS, A CORPORATION OF MASSACHUSETTS.

BLADE-GRINDING MACHINE.

1,034,362.

Specification of Letters Patent. Patented July 30, 1912.

Application filed October 18, 1911. Serial No. 655,330.

*To all whom it may concern:*

Be it known that I, JOHN P. GUPPEY, a citizen of the United States, and a resident of Boston, in the county of Suffolk and State of Massachusetts, have invented certain new and useful Improvements in Blade-Grinding Machines, of which the following is a specification.

This invention relates to machines for grinding blades such as those used for safety razors, each blade being a flat strip of sheet steel and ground to sharpen one of its longitudinal edges.

The invention has for its object to provide a machine adapted to automatically and accurately grind a group or series of blades supplied to it, and it consists in the improvements hereinafter described and claimed.

Of the accompanying drawings which form a part of this specification,—Figure 1 represents a plan view of a machine embodying the invention; Fig. 1$^a$ represents a section on line 1$^a$, 1$^a$, of Fig. 1; Fig. 2 represents an end view of the same; Fig. 3 represents a section on line 3—3 of Fig. 1; Fig. 4 represents a section on line 4—4 of Fig. 1; Fig. 5 represents a section on line 5—5 of Fig. 1; Fig. 6 represents a section on line 6—6 of Fig. 1; Fig. 6$^a$ represents an enlargement of a portion of Fig. 6; Fig. 7 represents a section on line 7—7 of Fig. 1; Fig. 8 represents a section on line 8—8 of Fig. 1; Fig. 9 represents a section on line 9—9 of Fig. 1; Fig. 10 represents a section on line 10—10 of Fig. 9; Fig. 11 represents a section on line 11—11 of Fig. 8.

Similar reference characters indicate the same or similar parts in all the figures.

In the drawings, 12 represents a bed or table supported by legs 13.

14 represents an elongated standard projecting upwardly from and affixed to the bed. On one end portion of the standard is mounted a raceway which is preferably composed of two plates or bars 15, 16, abutted together side by side, the bar 15 being elongated and affixed to the standard 14 while the bar 16 is relatively short and attached to the elongated bar 15 by screws 17. The inner side of the bar 16 has a recessed portion 18, Fig. 5, which forms one side of the raceway, the opposite side of which is formed by a portion of the inner side of the elongated bar 15. The raceway is adapted to guide endwise thin steel blades 19, the width of the raceway being such that the sides of a blade 19 inserted in it have a fairly close sliding fit against the sides of the raceway. The lower edge or bottom of the raceway is preferably formed by a strip or ledge 20 of hardened steel inserted in grooves in the inner sides of the bars 15 and 16, said ledge being adapted to sustain wear caused by the movement of the lower edges of the blades upon it, and being removable in case it becomes worn.

21 and 22 represent grinding wheels of any suitable material attached to shafts 23, 23, which are journaled in bearings supported by and above the bed 12. The said shafts are parallel with the raceway and located at opposite sides thereof. The grinding wheels are in different planes, each at right angles with the raceway instead of being opposite each other, or in the same plane, so that their peripheries are adapted to enter the raceway to any extent desired to cause the formation of intersecting beveled faces and a cutting edge on a blade 19 moved endwise in the raceway, one wheel acting on one side of the blade and the other on the opposite side. Each of the bars 15 and 16 has a slot or recess 24 in its outer side, said slots intersecting the raceway and permitting the grinding wheels to project thereinto, as shown by Figs. 4 and 6.

Opposite the periphery of each grinding wheel is a rest 25 adjustably secured to one of the raceway bars by a screw 26 passing through a slot 27. Each rest supports one side of the blade and maintains the proper relation between its opposite side and the periphery of the grinding wheel, which acts thereon. The grinding wheel shafts 23 are journaled in bearings on adjustable standards 28 which are pivoted at 29, Fig. 2, to ears 30, on the bed 12, and are provided with lateral levers 31 projecting over the bed and adjustable by means of screws 32, 33 which are adapted to support the levers in different positions and impart swinging adjustments to the standards 28, so that the peripheries of the grinding wheels may be adjusted edgewise to compensate for wear and cause uniform grinding of the blades. The screws 33 exert a bearing down pressure on the levers 31, and are engaged with threaded sockets in the bed 12, and the screws 32 are engaged with threaded sockets in the levers 31 and bear on the bed 12. The grinding wheels are rotated in opposite directions, as indicated by the arrows, Figs. 2, 4 and 6, by driving belts 35 running on pulleys 36, on the shafts 23, the direction of rotation of the wheels being such that they press the blades on which they act against the ledge 20, which forms the bottom of the raceway, the sharpened edge of the blade being prevented by the grinding wheels from contacting with the opposite edge or top of the raceway and being dulled thereby.

The raceway bar 16 is attached to one end portion of the elongated bar 15 and is shorter than the latter so that a considerable portion of the bar 15 projects from the raceway formed by the contacting portions of the bars 15 and 16, the projecting portion 15ª of the bar 15 constituting an extension of one side of the raceway, and a stop which limits the sidewise movement of a pack of blades inserted in a blade magazine 37 located at one side of the extension 15ª and adapted to support a pack of blades, and guide the said pack so that the foremost blade thereof is pressed against the said extension, and is supported thereby in alinement with the recess 18 in the bar 16. The magazine 37 is composed of a bottom member 37ª, and side members 37ᵇ, Figs. 3 and 9, relatively arranged to guide the pack of blanks toward the raceway extension 15ª, and an end member 37ᶜ, Fig. 1, having an orifice in which is adapted to slide a rod 38 having a head 39 bearing on the rear side of the pack of blades. A helical spring 40 attached at 42 (Fig. 1) to the rod 38, and at 43 (Fig. 1) to the end member 37ᶜ is extended by a pack of blades interposed between the presser 39, and the raceway extension 15ª and normally contracts to force the presser and the pack of blades toward said extension. The foremost blade of the pack is therefore pressed against the raceway extension 15ª and held in alinement with the recess 18, in readiness to be forced endwise through said recess and presented to the grinding wheels, by the reciprocating plunger next described.

The bar 15 is provided at its inner side with a groove 44 which extends through the extension 15ª. In said groove is fitted a plunger 45 which is formed to project from the groove and from the inner side of the extension 15ª, as shown by Fig. 7, the plunger being reciprocated by the mechanism hereinafter described. The plunger projects from the extension 15ª a distance somewhat less than the thickness of a blade 19, so that it is adapted to engage only the forward blade of the pack and move the same endwise without engaging the succeeding blade. When the plunger is retracted it is withdrawn from the portion of the extension 15ª which arrests the foremost blade of the pack and when the plunger is projected it engages one end of the foremost blade and forces said blade into the recess 18 and presents it to the grinding wheel 21. The distance between the planes in which the two grinding wheels rotate and the throw of the plunger 45 are preferably so proportioned that the blade directly engaged by the plunger is presented only to the grinding wheel 21 by the projection of the plunger, the succeeding foremost blade which is pressed against the extension 15ª becoming an intermediary, which while being moved endwise by the plunger and presented to the grinding wheel 21, also moves the preceding partially ground blade endwise and presents it to the grinding wheel 22, each completely ground blade being ejected from the raceway through a blade interposed between it and the plunger. The mechanism which reciprocates the plunger is preferably organized as next described.

47 represents a slide to which the outer end of the plunger 45 is attached, said slide being movable on the extension 15ª which is provided with means for guiding the slide, the latter being reciprocated to impart the described movements to the plunger. As here shown, the inner side of the extension 15ª has a recess 48 and gibs 49 (Figs. 9 and 11), said recess and gibs constituting the guide for the slide 47.

50 represents a bell crank lever pivoted at 51 to an arm 52 projecting downwardly from the bed 12. One arm of said lever has a slot 53 through which passes a screw 54 attached to the slide 47. The other arm of the lever 50 has a trundle roll 55 which enters a cam groove 56 in a disk 57 affixed to a shaft 58. Said shaft is journaled in fixed bearings below the bed 12, and is provided with a bevel gear 59, meshing with a bevel gear 60 on a driving shaft 61. The cam groove is so formed that the rotation of the disk 57 oscillates the lever 50 and causes the latter to reciprocate the slide 47 and plunger 45. The cam groove 56 preferably has the form shown by Fig. 8, a portion of said groove having a pronounced curvature and another portion a lesser curvature, the form of the groove being such that during one-half of a complete rotation of the disk 59 from the position shown by Fig. 8, and in the direction indicated by the arrow *x*, a relatively slow movement is imparted to the lever in the direction indicated by the arrow *y*, the slide 47 and the plunger 45 being thus slowly projected, and during the completion of said rotation the slide and plunger are rapidly retracted.

The gear 60 has a frictional connection with the shaft 61, instead of being positively connected therewith, so that said gear is adapted to slip on the shaft when the endwise movement of the blade is retarded by the grinding wheels, or resisted by any obstruction, proper grinding of the blades being thus insured and injury to the mechanism and blades prevented. As here shown, the gear 60, which is adapted to turn independently on the shaft, is adjustably confined by a nut 63 between a collar 64 affixed to the shaft 61, and a washer 65 pressed by the nut against the gear, the shaft being screw-threaded to engage the nut 63. The frictional connection thus provided between the gear 60 and shaft 61 causes the rotation of the gear by the shaft under normal conditions, and permits the gear to slip on the shaft when the forward movement of a blade is materially retarded or obstructed.

I claim:—

1. A blade grinding machine comprising a raceway adapted to guide a blade endwise in a rectilinear path, a pair of grinding wheels arranged in different planes to grind opposite sides of a blade moving in the raceway, means for delivering blades to the raceway and means for forcing the delivered blades endwise through the raceway.

2. A blade grinding machine comprising a raceway adapted to guide a blade endwise in a rectilinear path, a pair of grinding wheels arranged in different planes to grind opposite sides of a blade moving in the raceway, one side of the raceway being extended to form a guide, a blade reservoir opposite said guide, means for pressing a pack of blades sidewise toward the guide, the foremost blade being arrested by the guide, and a reciprocating plunger movable beside the guide and adapted to force the foremost blade endwise through the raceway.

3. A blade grinding machine comprising a raceway adapted to guide a blade endwise in a rectilinear path, a pair of grinding wheels arranged in different planes to grind opposite sides of a blade moving in the raceway, means for delivering blades to the raceway, means for forcing the delivered blades endwise through the raceway and adjustable rests attached to the walls of the raceway and adapted to hold the blades against the grinding wheels.

4. A blade grinding machine comprising a raceway adapted to guide a blade endwise in a rectilinear path, a pair of grinding wheels arranged to grind opposite sides of a blade moving in the raceway, means for delivering blades sidewise into alinement with the raceway and a plunger movable lengthwise of the raceway and adapted to force the delivered blades endwise through the raceway.

5. A blade grinding machine comprising a raceway adpated to guide a blade endwise in a rectilinear path, a pair of grinding wheels arranged to grind opposite sides of a blade moving in the raceway, one side of the raceway being extended to form a guide, a blade reservoir opposite said guide, means for pressing a pack of blades sidewise toward the guide, the foremost blade being arrested by the guide, a reciprocating plunger movable beside the guide and adapted to force the foremost blade endwise through the raceway, and mechanism for reciprocating said plunger, said mechanism having provisions for giving the plunger a relatively slow forward movement and a quicker return movement.

6. A blade grinding machine comprising a raceway, adapted to guide a blade endwise in a rectilinear path, a pair of grinding wheels arranged to grind opposite sides of a blade moving in the raceway, one side of the raceway being extended to form a guide, a blade reservoir opposite said guide, means for pressing a pack of blades sidewise toward the guide, the foremost blade being arrested by the guide, a reciprocating plunger movable beside the guide and adapted to force the foremost blade endwise through the raceway, and mechanism for reciprocating said plunger, said mechanism having provisions for giving the plunger a yielding forward movement.

7. A blade grinding machine comprising a raceway composed of two bars of different lengths secured together side by side, the shorter bar being provided with a recess forming one side and two edges of the raceway, while the longer bar forms the opposite side of the raceway and an extension of one side thereof, and is provided with a groove, a plunger movable in said groove and projecting therefrom, means for moving a pack of blades sidewise toward said extension, means for moving said plunger to force the foremost blade through the raceway and a pair of grinding wheels arranged to grind opposite sides of a blade in the raceway.

8. A blade grinding machine comprising a raceway composed of two bars secured together side by side, portions of the inner sides of said bars forming the sides of the raceway and a ledge formed independently of the bars and removably engaged therewith, said ledge constituting the bottom of the raceway, means for forcing blades endwise through said raceway, and a pair of grinding wheels arranged in different planes to grind opposite sides of a blade in the raceway, the grinding wheels being adapted to press the blades against said removable ledge.

9. A blade grinding machine comprising a raceway adapted to guide a blade endwise in a rectilinear path, a pair of grinding wheels arranged to grind opposite sides of a blade in the raceway, a plunger adapted to force blades endwise through the raceway, and mechanism for reciprocating the plunger, said mechanism having provisions for giving the plunger a relatively slow forward movement and a quicker return movement.

10. A blade grinding machine comprising a raceway adapted to guide a blade endwise in a rectilinear path, a pair of grinding wheels arranged to grind opposite sides of a blade in the raceway, a plunger adapted to force blades endwise through the raceway, and mechanism for reciprocating the plunger, said mechanism having provisions for giving the plunger a yielding forward movement.

11. A blade grinding machine comprising a raceway adapted to guide a blade endwise in a rectilinear path, a pair of grinding wheels arranged to grind opposite sides of a blade in the raceway, a plunger movable in the raceway, a driving shaft and connections between the shaft and the plunger for reciprocating the latter, said connections including members having a frictional engagement with each other whereby the plunger is permitted to stop during its forward movement.

In testimony whereof I have affixed my signature, in presence of two witnesses.

JOHN P. GUPPEY.

Witnesses:
C. F. Brown,
P. W. Pezzetti.